United States Patent
Ram et al.

(10) Patent No.: US 9,949,131 B2
(45) Date of Patent: *Apr. 17, 2018

(54) DEAUTHENTICATING AND DISASSOCIATING UNAUTHORIZED ACCESS POINTS WITH SPOOFED MANAGEMENT FRAMES

(71) Applicant: Fortinet, Inc., Sunnyvale, CA (US)

(72) Inventors: Mohan Ram, Bangalore (IN); Anil Kaushik, Marathalli Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,873

(22) Filed: May 4, 2017

(65) Prior Publication Data

US 2017/0303130 A1    Oct. 19, 2017

Related U.S. Application Data

(63) Continuation of application No. 13/936,213, filed on Jul. 8, 2013, now Pat. No. 9,681,299.

(51) Int. Cl.
*H04W 12/08* (2009.01)
*H04W 12/12* (2009.01)
*H04W 88/08* (2009.01)

(52) U.S. Cl.
CPC ........... *H04W 12/08* (2013.01); *H04W 12/12* (2013.01); *H04W 88/08* (2013.01)

(58) Field of Classification Search
USPC ............ 726/2, 3, 21, 36; 713/150, 163, 181; 380/255, 264, 276
See application file for complete search history.

(56) References Cited

U.S. PATENT DOCUMENTS

| | | | | |
|---|---|---|---|---|
| 7,336,670 B1* | 2/2008 | Calhoun | ................ | H04L 63/10 370/252 |
| 2005/0102529 A1* | 5/2005 | Buddhikot | ............. | H04L 63/02 726/26 |
| 2007/0218875 A1* | 9/2007 | Calhoun | .............. | H04L 63/126 455/411 |
| 2008/0159535 A1* | 7/2008 | Kim | ...................... | H04W 12/06 380/258 |
| 2009/0235354 A1* | 9/2009 | Gray | .................. | H04L 63/1416 726/22 |
| 2011/0088078 A1* | 4/2011 | Kholaif | ................ | H04W 12/06 726/3 |
| 2013/0201918 A1* | 8/2013 | Hirakawa | ............ | H04W 36/06 370/328 |

* cited by examiner

*Primary Examiner* — Farid Homayounmehr
*Assistant Examiner* — Sharif E Ullah
(74) *Attorney, Agent, or Firm* — Law Office of Dorian Cartwright; Dorian Cartwright

(57) ABSTRACT

A spoofed management frame is sent to an unauthorized access point (AP) on behalf of a station from an authorized AP, using a media access control (MAC) address of the station. The spoofed frame triggers a security association (SA) query from an unauthorized AP to reestablish valid communications. An acknowledgment (ACK) frame sent from the client to the unauthorized AP responsive to the SA query request is detected by the AP. A probe response is sent to the client. The probe response includes a channel switching element. The channel switching prevents the client from completing the SA process before a time out.

15 Claims, 10 Drawing Sheets

| Element ID 210 | Length 220 | Channel Switch Mode 230 | New Channel Number 240 | Channel Switch Count 250 |

DEAUTHENTICATING AND DISASSOCIATING UNAUTHORIZED ACCESS POINTS WITH SPOOFED MANAGEMENT FRAMES

CROSS-REFERENCE TO RELATED APPLICATIONS

This application claims priority as a continuation of U.S. application Ser. No. 13/936,213, filed Jul. 8, 2013, entitled DEAUTHENTICATING AND DISASSOCIATING UNAUTHORIZED ACCESS POINTS WITH SPOOFED MANAGEMENT FRAMES, by Mohan Ram, et al., the contents of which are hereby incorporated by reference in its entirety.

FIELD OF THE INVENTION

The invention relates generally to computer networking, and more specifically, to disconnecting unauthenticated access points (APs) from a local area network.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances. Many networks with wireless devices use an access point (AP) with a radio and antenna as an interface between wireless devices and the backbone network which is typically wired. Wireless devices can discover available APs within range of their radios by listening for beacons broadcast by APs which include an identifier such as a basic service set identifier (BSSID). Wireless device use the identifier in a probe request to initiate a connection to the identified AP.

One problem with networks for wireless devices is that unauthorized access points can be introduced to the system and advertise a connection point to wireless devices. Wireless devices may be unaware of which APs are authorized and unsuspectingly respond to a beacon. This situation causes a serious vulnerability to an entity because the unauthorized access point may then become privy to confidential information transferred to and from unsuspecting wireless devices, allowing data theft. Operators of unauthorized access points may are not always devious. In one case, an employee adds an additional access point to an area with poor coverage, without realizing the consequences.

Furthermore, the unauthorized AP is not subject to policies and procedures promulgated by network administrators through access points. For example, undesirable wireless devices making prohibited data transfers, such as video downloads or chat sessions, can steal network bandwidth from other operations more critical to the entity.

In addition, as a wireless device, a network administrator attempting to manually find and shut down the AP takes a great deal time and effort. Directly ordering wireless devices is hampered by the fact that wireless stations generally communicate with one AP at a time, as selected by the wireless device. Moreover, those communications under an increasingly prevalent IEEE 802.11w take place over a secured channel between devices that have been authenticated and associated. Thus, a direct order is not possible from devices that, from the perspective of the wireless devices, are not trusted.

What is needed is a robust technique to disconnect the unauthenticated APs in view of these problems.

SUMMARY

To meet the above-described needs, methods, computer program products, and systems for disconnecting unauthorized access points (APs) from a network using spoofed management frames.

In one embodiment, a spoofed management frame comprising an unprotected association request is sent to an unauthorized AP on behalf of a station from an authorized AP on a wireless network, using a media access control (MAC) address of the station. The request triggers a security association (SA) query from an unauthorized AP to reestablish valid communications. An acknowledgment (ACK) frame sent from the client to the unauthorized AP responsive to the SA query request is detected by the AP. In an embodiment, an unprotected probe response is sent to the client. The probe response includes a channel switching element. The channel switching prevents the client from completing the SA process before a time out. The probe response is not required to be protected in accordance with Institute of Electrical and Electronics Engineers (IEEE) 802.11w, hence it can be sent unprotected.

In another embodiment, the spoofed management frame comprises an unprotected disassociation/deauthentication request is sent to a station on behalf of the unauthorized AP from an AP, using a MAC address of the unauthorized AP.

Advantageously, unauthorized APs can be automatically disconnected from stations of a network.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a block diagram illustrating a Channel Switch Announcement information element, according to one embodiment.

DETAILED DESCRIPTION

Methods, computer program products, and systems for disconnecting unauthorized access points (APs) from a network using spoofed management frames.

Figure 1A:
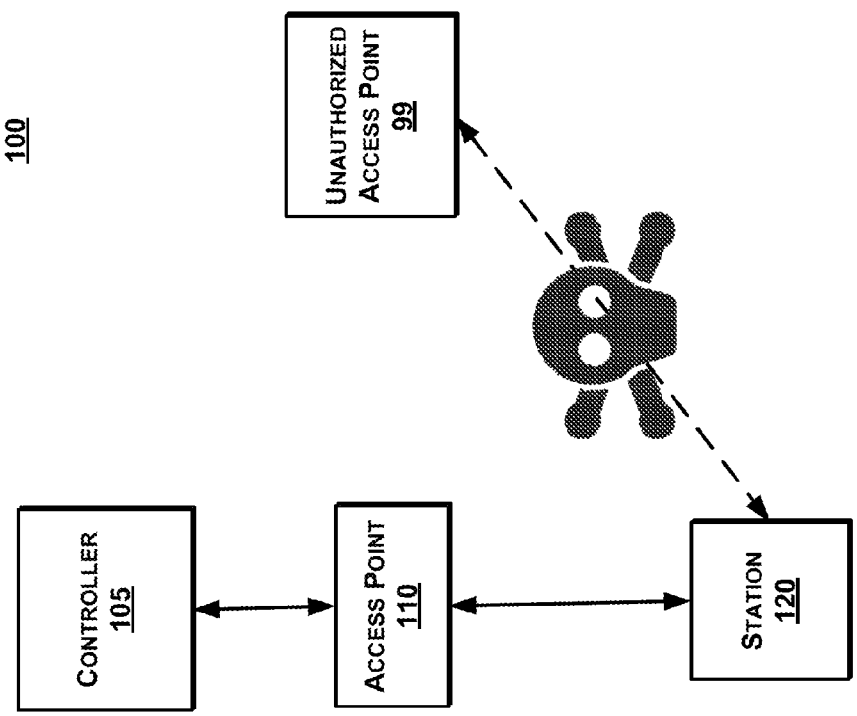
FIG. 1A is a high-level block diagram illustrating a system for controlling unauthorized APs with unprotected association requests, according to one embodiment.
Figure 1C:
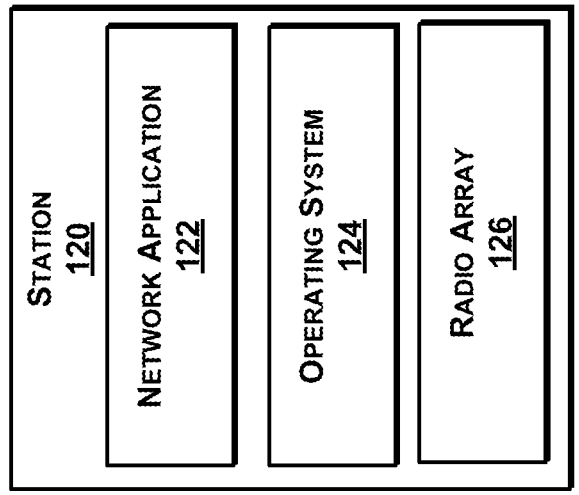
FIG. 1C is a more detailed block diagram illustrating a station of the system of FIG. 1A, according to one embodiment.
Figure 1B:
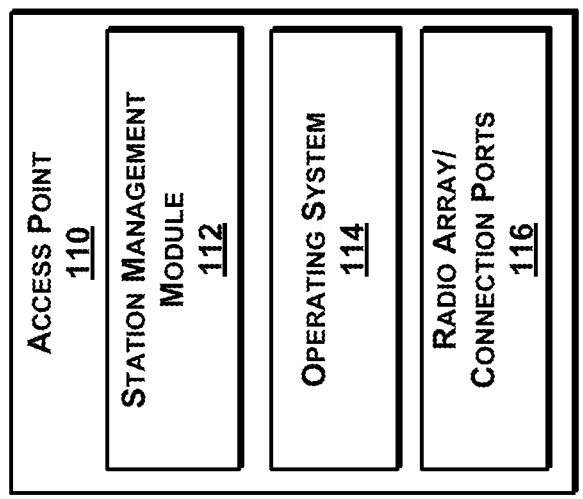
FIG. 1B is a more detailed block diagram illustrating an AP of the system of FIG. 1A, according to one embodiment.

Systems for Controlling Unauthorized APs (FIGS. 1A-C)

FIG. 1A is a high-level block diagram illustrating a system for controlling unauthorized APs with unprotected association requests, according to one embodiment. The system 100 includes an AP 110, an optional controller 105 and a station 120 coupled in communication with an unauthorized AP 99. Other embodiments of the system 100 can include additional network components that are not shown in FIG. 1A. For example, there can be more APs (authorized and unauthorized) and more stations. There can also be network devices such as switches, routers, fire walls, proxy servers, and the like.

Figure 6:
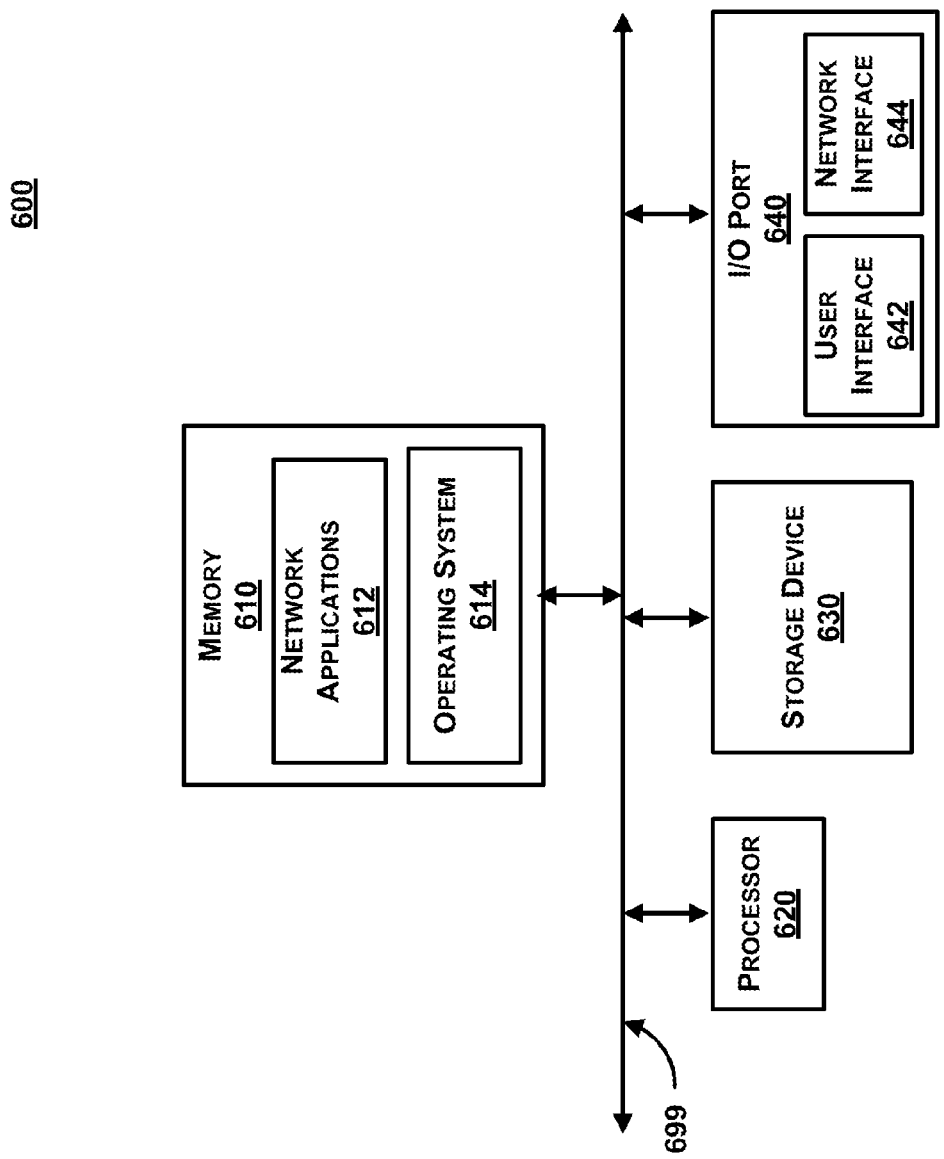
FIG. 6 is a block diagram illustrating an exemplary computing device, according to one embodiment.

The AP (or authorized AP) 110 can be any of the computing devices, such as a personal computer, a server blade, any computing environment as shown in FIG. 6. For example, the AP 110 can be an Access Point—Model 110 or an Access Point—Model 433 (modified as discussed herein) by Meru Networks of Sunnyvale, Calif. The AP 110 is preferably connected to the network 199 (or to a switch, router, hub, or another AP that is connected to the network 199) via a wired or wireless connection. The AP 110 can be set-up in various configurations with other APs to provide wireless coverage areas. In one embodiment, the functionality is incorporated into a switch or router, and in another embodiment, is incorporated into a custom enclosure. In operation, the AP 110 transmits network packets to and from station 120.

The unauthorized (or rogue) AP 99 can be an identical or similar device to the (authorized) AP 110. The characterization as unauthorized refers to whether or not APs have permission to join a network or communication with a particular station. For example, an employee of a company can bring a personal AP from home and connect it to the wired network backbone to provide better coverage area or strength to a local area network. Also, a data thief can set up a covert access point in a parking lot of a company. In still another example, the unauthorized AP 99 may be friendly to the network, but has not yet completed its own authentication or association in a satisfactory manner because of many reasons. Additionally, an authorized AP can be manually deauthorized by a network administrator or automatically deauthorized due to abnormal behavior (e.g., high network usage).

In some embodiments, the AP 110 disconnects the unauthorized AP from the station 120 using spoofed management frames, such as unprotected association, disassociation and/or deauthentication requests. The requests trigger an SA (security association) query to confirm that a security association has been compromised. Generally, the requests indicate when stations choose to join or leave an AP or network, or when stations are being ejected by an AP. The frames are unprotected because the encapsulated information is not encrypted, contrary to IEEE 802.11w protocol. If the frames were correctly protected, there would be no SA query.

There are three states to describe the relationship between APs or unauthorized APs, with mobile stations: 1) unauthenticated and unassociated; 2) authenticated and unassociated; and 3) authenticated and associated. An additional level of IEEE 802.1x authentication is available. Initially both APs and mobile stations are in state 1. After selecting APs for network access, and successful completion of a challenge-response sequence (e.g., WEP shared key authentication), the components move to state 2. Finally, mobile stations associate with APs to move to state 3. Upon receiving a disassociation request, the components return to state 2, or upon receiving a deauthentication request, the components return to state 1 from either state 2 or 3. Messages cannot be exchanged in either states 1 or 2, but the components are preferably returned to state 1 in which the keys and states are deleted and both authentication and association are required to reestablish unauthorized communications.

In still other embodiments, the AP 110 can operate under the direction of the controller 105 in managing the unauthorized APs. The controller 105 (e.g., an MC1500 or MC6000 device by Meru Networks of Sunnyvale, Calif.) is above the AP 110 in a network hierarchy, allowing the controller 105 to provide high-level management of the AP 110 and other APs in the network 199. For example, the controller 105 can maintain a list of unauthorized BSSIDs and/or MACs and periodically check for reconnections. In another example, when an unauthorized connection with one mobile station is discovered, the controller 105 can direct other APs to check their coverage areas for the same unauthorized AP. Moreover, the controller 105 can maintain a list of overrides (e.g., not officially authorized APs) to stop the AP 110 from initiating a disconnection. Additional embodiments of the AP 120A-N are set forth below in FIG. 1C.

The station (or mobile station, STA, client or wireless device) 120 can be, for example, a personal computer, laptop computer, tablet computer, smart phone, mobile computing device, Internet appliance, end station or any other computing device as described in FIG. 6. Station 120 is wirelessly couples to APs using a radio and antenna. No pre-configuration or client is needed. The station 120 operates according to wireless standards such as IEEE 802.11a, b, g, n, ac, w or any other wireless standard. The station 120 sends and/or receives network packets for applications being executed. Embodiments of the station 120 are discussed in more detail below in association with FIG. 1D.

FIG. 1B is a more detailed block diagram illustrating the (authorized) AP 110 of the system of FIG. 1A, according to one embodiment. The AP 110 includes a station management module 112, an operating system 114, and a radio array/connection ports 116. The components can be implemented in hardware, software, or a combination of both.

The station management module 112 manages station connections by advertising beacons, receiving probe request, sending probe responses and other management frames. Further, individual stations can be tracked as to bandwidth usage, QoS, BSSID assignment, and the like.

The operating system 114 interfaces between the software and hardware of the AP 110. The operating system 114 can also include integrated applications. The operating system 114 can handle connections to stations by sending out beacons.

The radio array 116 includes one or more transmit (Tx) and receive (Rx) antennas and electronics (e.g., encoders/decoders) for communication with the physical layer.

FIG. 1C is a more detailed block diagram illustrating a station 120 of the system of FIG. 1A, according to one embodiment. The station 120 comprises a network application 122, an operating system 124, and a radio array 126. The components can be implemented in hardware, software, or a combination of both.

The network application 122 can be any application executing on the station 120 that makes use of network access in operation. Examples of the network application 122 include a network browser, a VOIP telephone service, a streaming video player, a database viewer, a VPN client, and the like.

The operating system 124 is responsible for connecting to a communication channel for data exchange, among other tasks. To do so, the operating system 124 listens for beacons broadcast by APs, and generates a probe request to connect to a selected AP. After connecting, the operating system 124 exchanges data packs and unpacks data packets in accordance with, e.g., a TCP/IP stack. More particularly, IEEE 802.11-type packets (e.g., IEEE 802.11ac packets) can be generated and received.

The radio array 126 includes one or more transmit (Tx) and receive (Rx) antennas and electronics (e.g., encoders/decoders) for communication with the physical layer.

FIG. 2 is a block diagram illustrating a Channel Switch Announcement information element 200, according to one embodiment. The Channel Switch Announcement information element includes an element ID field 210, a length field 220, a channel switch mode field 230, a new channel number field 240 and a channel switch count field 250.

The channel switch mode field 230 is set to 1 to stop mobile stations from transmitting frames until the channel switch has occurred. When set to 0, there is no such restriction. The channel number field 240 assigns a specific channel of the available bandwidth for switching. The channel switch count field 250 describes a certain number of beacon frame transmission intervals for the channel switch. When set to 0, the channel switch may occur without any further warning.

Figure 3A:
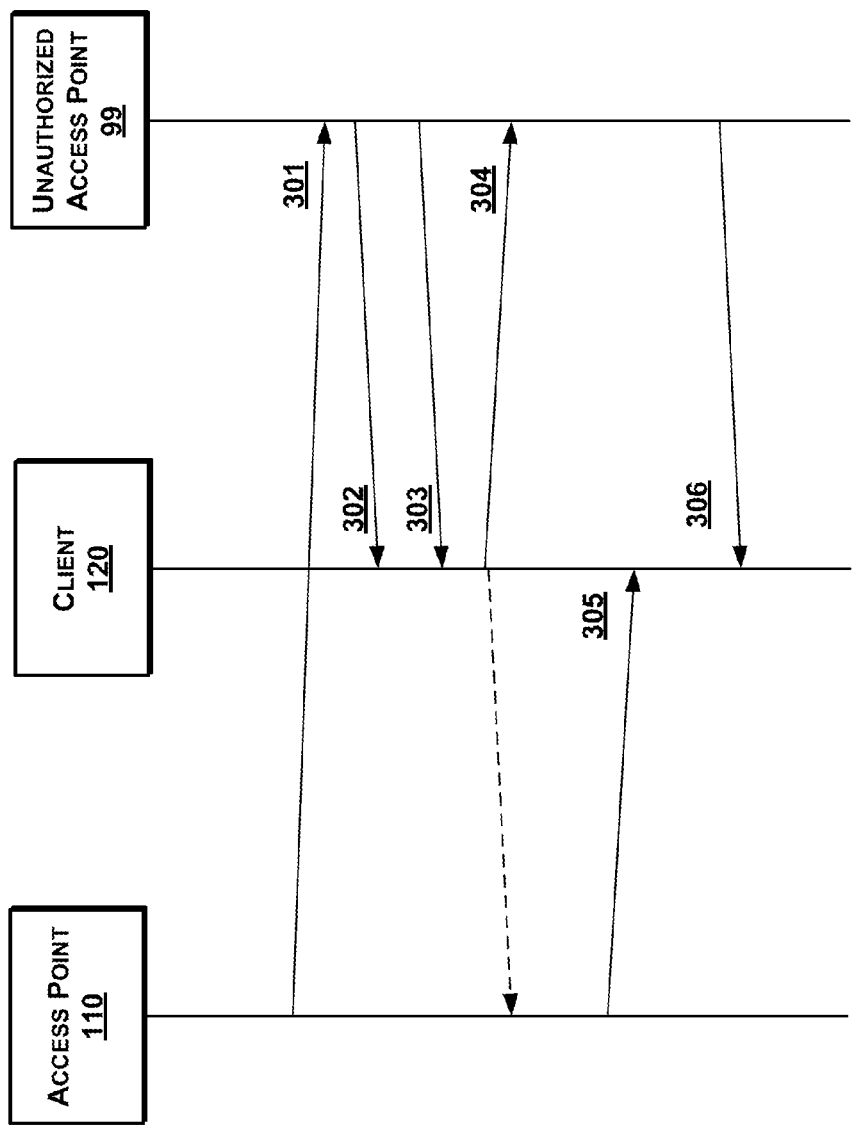
FIG. 3A is an interaction diagram illustrating a communication sequence for controlling unauthorized APs with unprotected association requests, through an unauthorized AP, according to one embodiment.

FIG. 3A is a component interaction diagram illustrating a communication sequence for controlling unauthorized APs with unprotected association requests, through an unauthorized AP 99, according to one embodiment. In other words, the unauthorized access point 99 is manipulated into initiating an SA query.

At interaction 301, the AP 110 (i.e., an authorized AP) sends a spoofed, unprotected association request to the unauthorized AP 99 on behalf of the client 120. At interaction 302, the unauthorized AP 99 sends a rejection of the association request to the client 120. The rejection can also specify a wait time (e.g., t). At interaction 303, the unauthorized AP 99 sends an SA request to the client 120. At interaction 304, the client 120 sends an ACK frame to the unauthorized AP 99.

At interaction 305, the AP 110 sends a unicast probe response to the client 120 after detecting the ACK frame, using a BSSID of the unauthorized AP 99. The response includes a channel switch element. The SA times out at the unauthorized AP 99 because of the channel switching, as described in more detail below. The unauthorized AP 99 then deletes the security association. At interaction 306, the unauthorized AP sends a disassociation request is sent to the client. Finally, the unauthorized AP 99 deletes the client 120 association from its database.

Figure 3B:
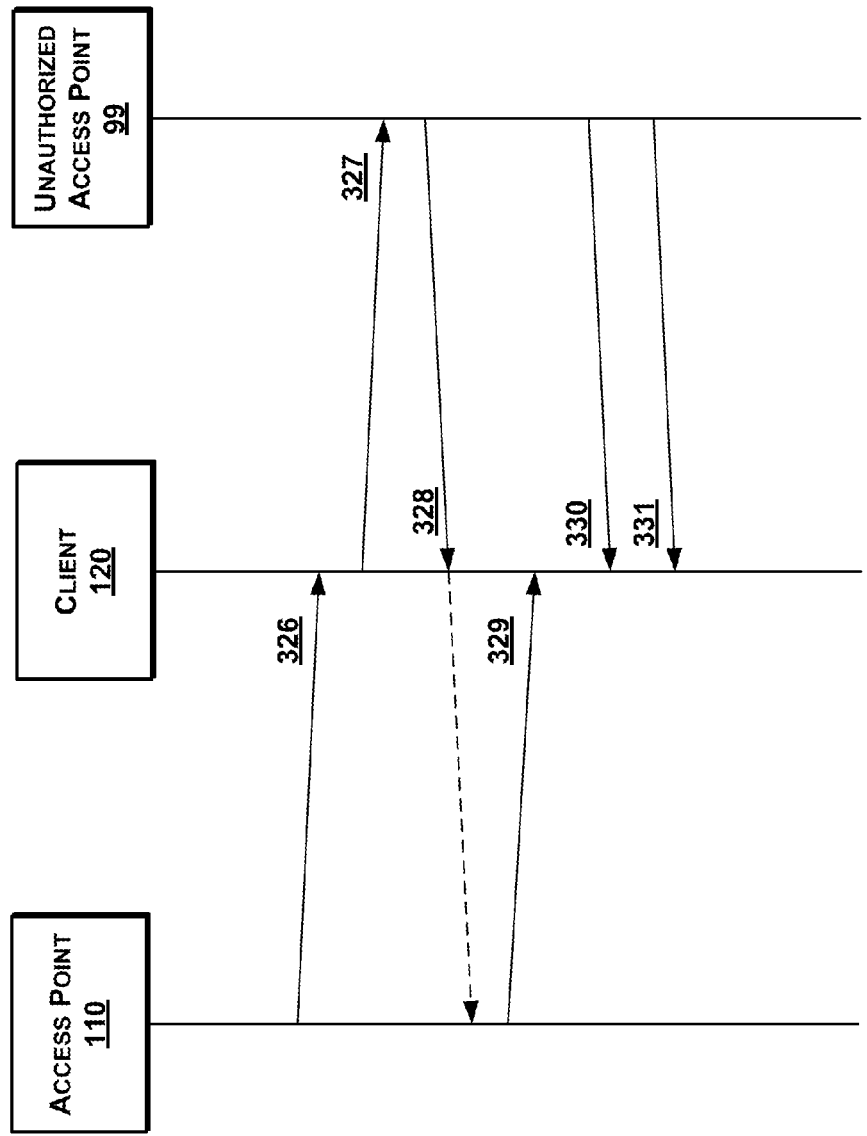
FIG. 3B is an interaction diagram illustrating a communication sequence for controlling unauthorized APs with unprotected association requests, through a client, according to one embodiment.

FIG. 3B is a component interaction diagram illustrating a communication sequence 325 for controlling unauthorized APs with unprotected association requests, through a client 120, according to one embodiment. Here, the client 120 is manipulated into initiating an SA query.

At interaction 326, the AP 110 sends a spoofed, unprotected dissociation/deauthentication request to the client 120 on behalf of the unauthorized AP 99. In one embodiment, the request indicates a reason code 6/7 or a similar indication. Under IEEE 802.11, reason code 6 corresponds to a class 2 frame received from a non-authenticated station, and reason code 7 corresponds to a class 3 frame received from a non-associated station. At interaction 327, the client 120 sends a security association query to the unauthorized AP 99. At interaction 328, the unauthorized AP 99 sends an ACK frame to the client 120. At interaction 329, the AP 99 sends an RTS to reserve medium to the client 120.

At interaction 330, the AP 110 sends a unicast probe response to the client 120, using a BSSID of the unauthorized AP 99. The response includes a channel switch element. As a result, the security association time out. Ultimately, the security association is deleted. At interaction 331, the AP 110 sends an unprotected disassociation/deauthentication request to the client 120 on behalf of the unauthorized AP 99. The request causes the client 120 to delete the association with the unauthorized AP 99.

Figure 3C:
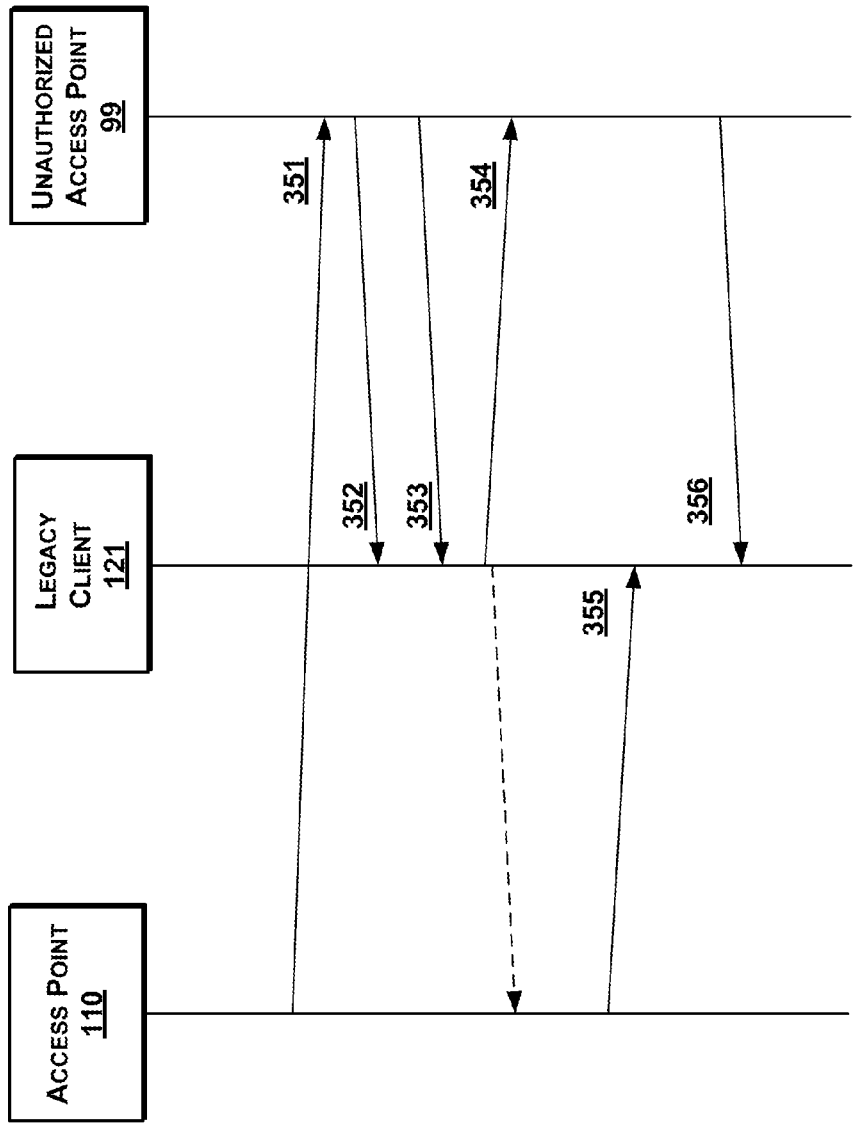
FIG. 3C is an interaction diagram illustrating a communication sequence for controlling unauthorized APs with unprotected association requests, through an unauthorized AP connected to a legacy client, according to one embodiment.

FIG. 3C is a component interaction diagram illustrating a communication sequence 350 for controlling unauthorized APs with unprotected association requests, through an unauthorized AP 99 connected to a legacy client 121, according to one embodiment. In the case of legacy clients that do not support IEEE 802.11h or similar protocols, a different technique can be used to achieve a similar effect. In sequence 350, the unauthorized AP 99 is manipulated into initiating the modified technique.

At interaction 351, the AP 110 sends a spoofed, unprotected association request to the unauthorized AP 99, on behalf of the legacy client 121. At interaction 352, the unauthorized AP 99 rejects the request with a wait time (e.g., t). At interaction 353, the unauthorized AP 99 sends a security association query to the legacy client 121. At interaction 354, the legacy client 121 sends an ACK frame to the unauthorized AP 99.

At interaction 355, the AP 110 sends an RTS (Request to Send) frame to the legacy client 121, on behalf of the unauthorized AP 99. Optionally, the legacy client 121 sends a CTS (Clear to Send) frame as an ACK to the RTS frame that also notifies hidden components of the reservation. The RTS frame has a NAV (Network Allocator Vector) value set for greater than t, which causes the security association to time out at the unauthorized AP 99. The NAV value reserves the medium. Several RTS frames can be used to ensure that reservations exceed t. At interaction 356, the unauthorized AP 99 sends a disassociation request to the legacy client 121.

Figure 3D:
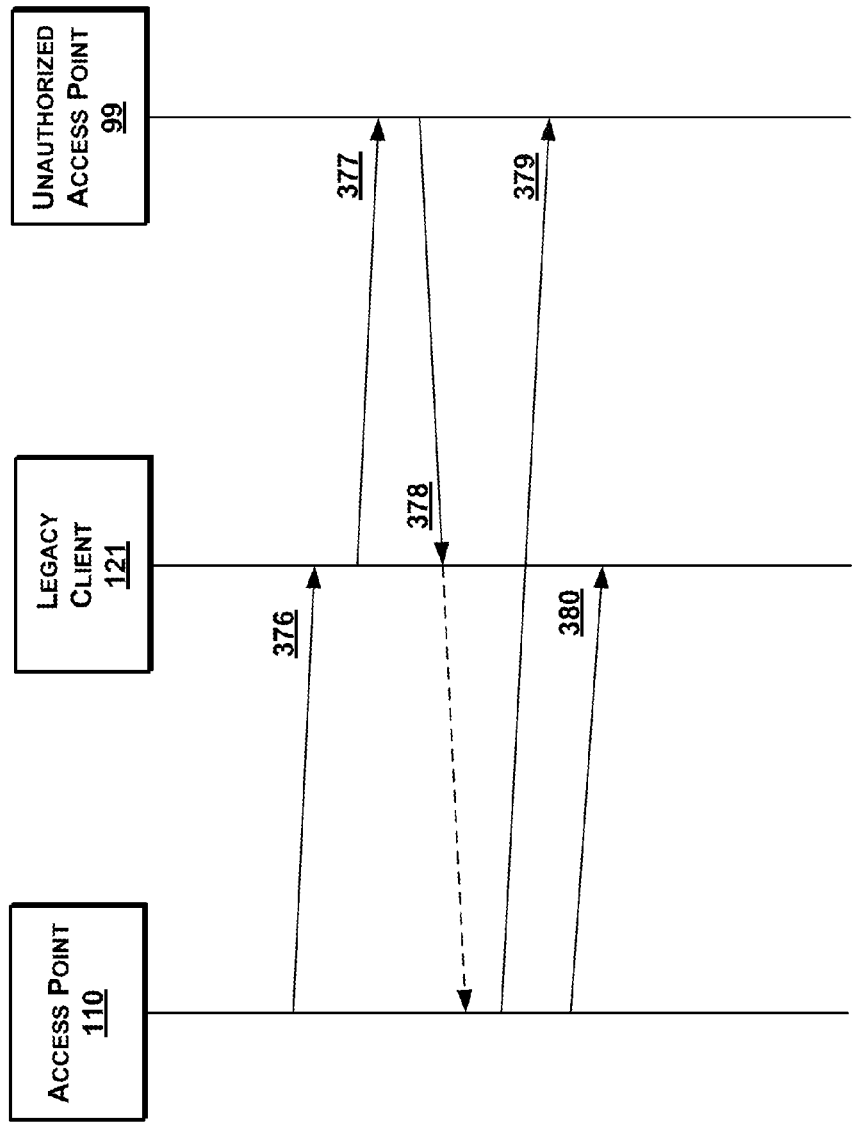
FIG. 3D is an interaction diagram illustrating a communication sequence for controlling unauthorized APs with unprotected association requests, through a legacy client, according to one embodiment.

FIG. 3D is a component interaction diagram illustrating a communication sequence 375 for controlling unauthorized APs with unprotected association requests, through a legacy client, according to one embodiment. In sequence 375, the legacy client is manipulated into initiating the modified technique.

At interaction 376, the AP sends a spoofed, unprotected disassociation/deauthentication request to the legacy client, on behalf of the unauthorized AP. At step 377, the legacy client sends a security association query to the unauthorized AP. At step 378, the unauthorized AP sends an ACK frame to the legacy client.

At step 379, the AP sends an RTS packet to the unauthorized AP, on behalf of the unauthorized AP. As a result, the security association times out at the legacy client, and it is deleted. At step 380, the AP sends an unprotected disassociation/deauthentication request to the legacy client, on behalf of the unauthorized AP.

Figure 4:
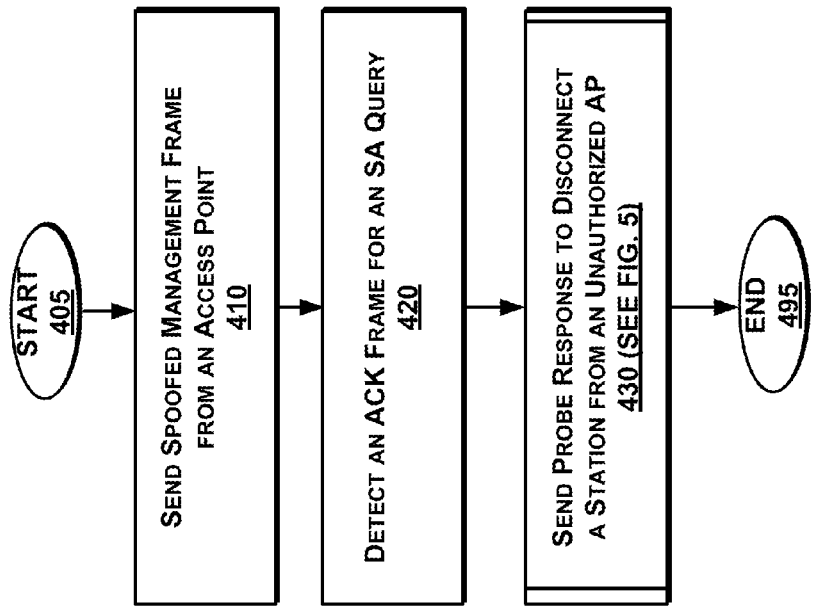
FIG. 4 is a high-level flow diagram illustrating a method for controlling rogue APs with unprotected association requests, according to one embodiment.
Figure 5:
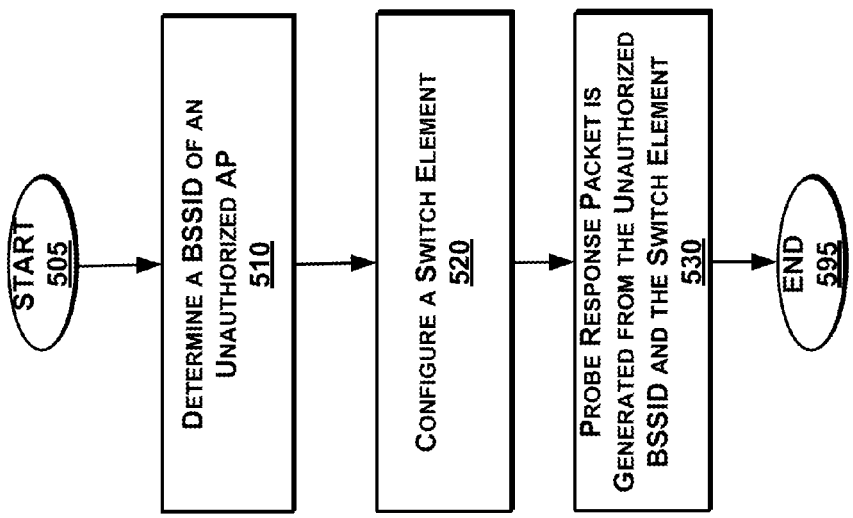
FIG. 5 is a more detailed flow diagram illustrating a step of disconnecting the client from the unauthorized AP, using the probe response in the method of FIG. 4, according to one embodiment.

Methods for Controlling Unauthorized APs (FIGS. 4-5)

FIG. 4 is a high-level flow diagram illustrating a method 400 for controlling unauthorized APs with unprotected association requests, according to one embodiment. The method 400 can be implemented by, for example, an authorized AP (e.g., AP 110 of FIG. 1A).

At step 410, a spoofed management frame is sent from the AP. In a first embodiment, a spoofed association request is sent to the unauthorized AP, on behalf of a client, from the AP. The source address of the request is set to the client and triggers an SA query from an unauthorized AP. The process can be repeated several times for different clients by using corresponding source addresses.

If the client is already associated with the unauthorized AP, the association request will be rejected and an association response frame is sent to the client. In the response, an association comeback time IE value can be set and a status field value can be set to 30. Next, an SA query request frame is sent from the unauthorized AP to the client, and an ACK frame is sent in response. The unauthorized AP waits for a response to the SA query request.

At step 420 an ACK frame is detected by the AP. The frame is sent from the client to the unauthorized AP responsive to the SA query request. The AP can listen to the channel for frames having a source address of the client and a destination address of the unauthorized AP. Once the frame has been detected, the process moves to step 430. Many other subroutines can occur while waiting for the ACK frame (e.g., associations and data transfers with other mobile stations).

At step 430, a probe response is sent by the AP to disconnect the client from the unauthorized AP. The probe response can include a channel switching element that prevents the client from completing the SA process before a time out, as described below in association with FIG. 5. The AP preferably sends the probe response before the client has time to send a probe response so that client switches channels prior to sending the response. Once the client switches channels, the probe response sent by the client is misdirected away from the unauthorized AP. Consequentially, the SA times out at the unauthorized AP and is deleted. A disassociation request follows from the unauthorized AP which also can delete the client from a database of associations.

In an alternative embodiment of method 400, the AP sends a spoofed, unprotected dissociation/deauthentication request to the client to initiate the SA query (see FIG. 3B), instead of the unauthorized AP (see FIG. 3A). In this case, the AP detects an ACK frame sent from the unauthorized AP to the client in response to an SA query received from the client. In turn, the AP optionally sends RTS packets to reserve the medium until a probe request or other frame encapsulating the switch element is sent to disconnect the client from the unauthorized AP. More specifically, the SA query times out and is deleted after the channel switch by the client. An additional disassociation/deauthentication request can be sent from the AP on behalf of the unauthorized AP so that the client will delete any association with the unauthorized AP.

In yet another embodiment, the process can be repeated for different clients against the same or other unauthorized APs. For example, repeating may be necessary if the first disconnection may be unsuccessful, or the unauthorized AP may reconnect to the same client or be connected to several client.

FIG. 5 is a more detailed flow diagram illustrating the step 430 of disconnecting the client from the unauthorized AP, using the probe response in the method 400 of FIG. 4, according to one embodiment.

At step 510, a BSSID of the unauthorized AP is determined. In one embodiment, the AP listens to beacons broadcast by APs within radio range. The beacon is then parsed to expose identifiers such as source MAC address and BSSIDs being advertised. Either of these identifiers can be used to, for example, identify BSSIDs that are not recognized as authenticated, or to compare against a list of known unauthorized APs. In another embodiment the AP sends out quiet elements in beacons or probe responses. The quiet element causes stations to stop transmission temporarily so that the channel can be monitored for other activities.

At step 520, a switch element is configured. In one embodiment, a switching mode of the switch element is set to 1 to make sure the client does not send any further frames. One implementation of a switch element is implemented through an ECSA (Extended Channel Switch Announcement) as described in the IEEE 802.11y Amendment, IEEE 802.11h, or IEEE 802.11n, or as described above in FIG. 3. Further, a channel switch count of the switching element can be set to 1 to make the channel switch occur immediately. In some cases, the channel switch element is followed with a new channel number. The number of channels can vary based on the standard. For example, 802.11b/g in the United States utilizes 11 channels while 802.11b/g in Europe utilizes 13 channels. Other configurations of the switch element are possible.

At step 530, a probe response packet is generated from the unauthorized BSSID and the switch element. The packet is falsely configured with the unauthorized BSSID as the source address so that mobile stations listening for packets will operates as if the unauthorized AP is initiating the channel switch. Alternatively, the switch element can be encapsulated in a Channel Switch announcement frame, a beacon frame, or any other suitable manner of communication to mobile stations.

Generic Computing Device (FIG. 6)

FIG. 6 is a block diagram illustrating an exemplary computing device 600 for use in the system 100 of FIG. 1A, according to one embodiment. The computing device 600 is an exemplary device that is implementable for each of the components of the system 100, including the AP 110, and the mobile stations 120A, B. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications or APs as illustrated in FIGS. 6 and 7. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a station of a wireless network, the method comprising:
    receiving a dissociation request from an access point (AP) on behalf of an unauthorized AP;
    sending an association request to the unauthorized AP using a media access control (MAC) address of the station as a source address, wherein the request triggers a security association (SA) query from the unauthorized AP;
    detecting an acknowledgment (ACK) frame sent from the unauthorized AP responsive to the SA query request; and
    responsive to the ACK frame detection, receiving a probe response to the station from the AP, wherein the probe response includes a channel switching element, said channel switching element preventing the station from completing the SA process with the unauthorized AP before a time out.

2. The method of claim 1, wherein:
    sending the association request comprises sending the association request operating under Institute of Electrical and Electronics Engineers (IEEE) 801.11w protocol that allows for unprotected requests.

3. The method of claim 1, wherein:
    sending the association request comprises sending the association request as an unprotected association request to the unauthorized AP operating under Institute of Electrical and Electronics Engineers (IEEE) 801.11w protocol that allows unprotected association requests, to trigger the SA request sent from the unauthorized AP for reestablishing valid communications, wherein protected communications are encrypted.

4. The method of claim 1, wherein:
    sending the probe response to the station comprises sending an unprotected probe response to the station operating under Institute of Electrical and Electronics Engineers (IEEE) 801.11w protocol that allows unprotected probe responses,
    wherein protected communications are encrypted.

5. The method of claim 1, further comprising:
    analyzing one or more beacon frames within range of the authorized AP to determine one or more basic service set identifiers (BSSIDs); and
    detecting an unauthorized BSSID.

6. The method of claim 5, wherein:
receiving a list of authorized BSSIDs from a controller that manages APs on the wireless network; and
detecting the unauthorized BSSID comprises comparing the one or more BSSIDs against the list of authorized BSSIDs.

7. The method of claim 5, wherein:
generating the association request using a BSSID from the one or more BSSIDs that is associated with the unauthorized AP.

8. The method of claim 5, wherein:
generating the probe response comprises generating the response probe using a BSSID from the one or more BSSIDs that is associated with the unauthorized AP.

9. The method of claim 1, wherein the channel switch element comprises a channel switch announcement information element, and the method further comprises:
configuring the switch element by setting a channel switch mode field of the probe response to a value of 1 to stop the station from transmitting to the unauthorized AP until a channel switch has occurred.

10. The method of claim 9, wherein:
configuring the switch element comprises setting a channel switch count field to a value of 0 for an immediate channel switch.

11. The method of claim 9, wherein:
detecting a channel being used by the unauthorized AP for communications with the station,
wherein configuring the switch element comprises setting a channel number field to a channel not being used by the unauthorized AP for communications with the station.

12. The method of claim 1, wherein:
sending the channel switching element prevents the station from completing the SA process with the unauthorized AP before a time out so that the unauthorized AP deletes a security association with the station.

13. The method of claim 12, wherein:
sending the channel switching element prevents the station from completing the SA process with the unauthorized AP before a time out so that the unauthorized AP disassociates from the station.

14. A non-transitory computer-readable medium storing instructions that, when executed by a processor, perform a computer-implemented method a station of a wireless station, the method comprising:
receiving a dissociation request from an access point (AP) on behalf of an unauthorized AP;
sending an association request to the unauthorized AP using a media access control (MAC) address of the station as a source address, wherein the request triggers a security association (SA) query from the unauthorized AP;
detecting an acknowledgment (ACK) frame sent from the unauthorized AP responsive to the SA query request; and
responsive to the ACK frame detection, receiving a probe response to the station from the AP, wherein the probe response includes a channel switching element, said channel switching element preventing the station from completing the SA process with the unauthorized AP before a time out.

15. A computer-implemented method in a station of a wireless network, the method comprising:
receiving a dissociation request from an access point (AP) on behalf of an unauthorized AP;
sending an unprotected association request to the unauthorized AP to the client using a media access control (MAC) address of the unauthorized AP as a source address, wherein the request triggers a security association (SA) query from the unauthorized AP;
detecting an acknowledgment (ACK) frame sent from the unauthorized AP responsive to the SA query request;
responsive to the ACK frame detection, receiving a probe response to the station from the AP, wherein the probe response includes a channel switching element, said channel switching element preventing the station from completing the SA process with the unauthorized AP before the time out; and
sending an unprotected dissociation/deauthentication request.

* * * * *